| United States Patent [19] | [11] 3,843,578 |
|---|---|
| Logemann et al. | [45] Oct. 22, 1974 |

[54] SOLUTIONS OF N-VINYL PYRROLIDONE COPOLYMERS

[75] Inventors: Heino Logemann, Leverkusen; Carlhans Süling, Odenthal-Hahnenberg; Günter Lorenz, Dormagen, all of Germany

[73] Assignee: Bayer Aktiengesellschaft, Leverkusen, Germany

[22] Filed: Aug. 17, 1972

[21] Appl. No.: 281,298

[30] Foreign Application Priority Data
Aug. 17, 1971 Germany............................ 2141060

[52] U.S. Cl.................. 260/29.6 AN, 117/138.8 A, 117/161 UT, 117/161 UN, 260/29.6 TA, 260/29.6 HN
[51] Int. Cl...................... C08f 19/00, C08f 45/24
[58] Field of Search........... 260/29.6 AN, 29.6 HN, 260/29.6 TA, 85.5 F, 86.1 N

[56] References Cited
UNITED STATES PATENTS
2,982,760   5/1961   Maragliano et al................ 260/85.5

FOREIGN PATENTS OR APPLICATIONS
1,960,242   6/1970   Germany
1,492,343   8/1967   France

OTHER PUBLICATIONS

Doyle, The Development And Use Of Polyester Products, McGraw–Hill Book Co. (1969), pp. 294–299.
Chem. Abstracts, 65:4020g (1966).
Chem. Abstracts, 71:125,844a (1969).
Chem. Abstracts, 75:7261t (1971).

*Primary Examiner*—Melvin Goldstein
*Assistant Examiner*—W. C. Danison
*Attorney, Agent, or Firm*—Plumley & Tyner

[57] ABSTRACT

The object of the invention are solutions of copolymers from N-vinylpyrrolidone and methylacrylate and-/or acrylonitrile which are prepared by polymerizing the monomers in solvents for acrylonitrile polymers p.i. in dimethyl formamide in the presence of an catalyst system comprising a peroxide and a sulfinic acid. The solutions are used as additives for spinning solutions containing acrylonitrile polymers.

9 Claims, No Drawings

SOLUTIONS OF N-VINYL PYRROLIDONE COPOLYMERS

This invention relates to a process for the production of solutions containing copolymers comprising from 10 to 99 percent by weight of N-vinyl pyrrolidone and from 1 to 90 percent by weight of methyl acrylate and/or acrylonitrile, and to the use of such solutions as additives for spinning solutions containing acrylonitrile polymers.

Copolymers of N-vinyl pyrrolidone with methyl acrylate and/or acrylonitrile have recently acquired considerable interest as additives for spinning solutions containing polyacrylonitrile, more particularly for spinning solutions containing copolymers of acrylonitrile with vinylidene chloride and/or vinyl chloride, because they are able to impart to articles, such as films, filaments or fibres, formed from these materials a permanent gloss which does not disappear under the effects of hot water or steam at elevated temperatures. In order to obtain such shaped articles, copolymers of N-vinyl pyrrolidone with, for example, methyl acrylate are prepared by conventional methods, the polymerisation mixtures being worked up and subsequently redissolved in polar solvents. They are then added to spinning solutions containing, for example, copolymers of acrylonitrile with vinylidene chloride in the form of such solutions in polar solvents. Spinning solutions so prepared can then be formed by extrusion through dies into a precipitant or into a gas stream.

It is clear that such a procedure is attended by serious disadvantages because continuous operation is either totally impossible or involves very considerable outlay, on account of the operations required in the working up and redissolution of the N-vinyl pyrrolidone copolymers.

The object of the invention is to produce solutions containing copolymers of N-vinyl pyrrolidone with methyl acrylate and/or acrylonitrile in a single operation by copolymerisation in liquids which are also solvents for polyacrylonitriles and for acrylonitrile copolymers.

According to the invention, this object is achieved by subjecting solutions containing from 5 to 50 percent of the monomer mixture in solvents for homopolymers of acrylonitrile or for copolymers of acrylonitrile with vinylidene chloride and/or vinyl chloride-optionally in the presence of from 0.2 to 2 percent of water or an aliphatic alcohol having from 1 to 4 carbon atoms — to polymerisation at temperatures below 80°C in the presence of a catalyst system comprising an organic peroxide or hydrogen superoxide together with an aromatic sulphinic acid.

Suitable polymerisation media include solvents normally used for polyacrylonitriles, such as dimethyl formamide, dimethyl acetamide, ethylene glycol carbonate, hexamethyl phosphoric acid triamide, dimethyl sulphoxide or concentrated solutions of inorganic salts, such as $ZnCl_2$, in water. In many cases, acetone, tetrahydrofuran or cyclohexanone is a suitable solvent for copolymers of acrylonitrile with vinyl chloride or with vinylidene chloride. If serviceable polymers are to be obtained, it is essential that the polymerisation be carried out at temperatures below 80°C.

In some cases, it may be advantageous to add to the solvent from 0.2 to 2 percent, preferably less than 1 percent, of water or aliphatic alcohols containing from 1 to 4 carbon atoms. It is possible in some cases to obtain a considerable increase in the rate of polymerisation in this way.

The concentration of monomers in the polymerisation mixture may vary from 5 to 50 percent, preferably from 20 to 30 percent.

The organic peroxide is used in a quantity of from 0.1 to 3 percent by weight, preferably from 0.5 to 1.5 percent by weight, based on the total quantity of monomers to be polymerised. The aromatic sulphinic acid is used in a quantity of from 0.1 to 3 mols, preferably from 0.2 to 0.5 mols, based on the organic peroxide.

Among suitable organic peroxides, hydroperoxides and peroxide esters, especially tert.-butyl hydroperoxide, cumene hydroperoxide, their homologues and substitution products, and the peroxide esters of tert.-butyl hydroperoxide, such as tert.-butyl perbenzoate, -peroctoate, -perpivalate, permaleic acid, have proved to be particularly favourable. Suitable aromatic sulphinic acids include benzene and p-toluene sulphinic acid and the homologues and substitution products of benzene sulphinic acid. These are best provided by treating their alkali salts with a strong inorganic acid just before the beginning of polymerisation, the conditions being selected so that no inorganic salts or impurities which are insoluble in the polymerisation medium are passed with the sulphinic acid into the polymerisation system.

In general, a total mixing ratio of N-vinyl pyrrolidone to the comonomer, methyl acrylate and/or acrylonitrile, of 1 to 99 percent is possible, although proportions of from 25 to 40 percent of N-vinyl pyrrolidone is preferred because, using a value within this range, it is possible to obtain a maximum effect in respect of gloss stabilisation of the acrylonitrile copolymer with an extremely low outlay in terms of vinyl pyrrolidone. In place of binary copolymers it is also possible to use, for example, ternary copolymers. Small quantities of other polymerisable vinyl for example vinyl esters can also be incorporated into the polymer.

Preferred temperatures are those near room temperature, for example from +10°C to +40°C, although lower temperatures, which give a higher molecular weight, and higher temperatures may also be adopted. At a temperature of 60°C for example, the polymers become increasingly yellow in colour unless precautions are taken to exclude atmospheric oxygen. At temperatures above 80°C, yellowing of the solution can only be prevented if particularly pure starting substances are used.

According to the invention, clear homogeneous solutions of copolymers of N-vinyl pyrrolidone with methyl acrylate and/or acrylonitrile in the aforementioned solvents for acrylonitrile-containing polymers are readily obtained with a substantially quantitative conversion at temperatures of from 10° to 80°C in a short period by means of an catalyst system comprising an organic peroxide or hydrogen superoxide and an aromatic sulphinic acid.

It must be regarded as surprising that a catalyst system in which free sulphinic acid is present should have been found to be particularly suitable for the production of such solutions of copolymers of N-vinyl pyrrolidone with methyl acrylate and/or acrylonitrile, because the polymerisation of N-vinyl pyrrolidone is, in general, seriously affected by acids, this monomer forming acetaldehyde and pyrrolidone in the presence of very small quantities of strong acids. Hitherto, one preferred method for polymerising N-vinyl pyrrolidone has been, for example, activation by means of $H_2O_2$ in the presence of ammonia or amines (cf. Houben-Weyl, Methoden der organischen Chemie, 4th Edition, Vol. XIV/1, pages 1113 et sec.). So far as practical applications are concerned, it is of considerable significance that, in the process claimed, the polymerisation reaction begins quickly at temperatures near room temperature and, even at such temperatures, can be brought to substantially quantitative completion providing that the monomer concentrations are not excessively high, if the monomer content were too highly viscous or pasty, stiff polymer solutions would be formed. Accordingly, there is no need for a separate operation in order to recover unreacted monomer, or for subsequent working up, as for example, when an excessively stiff paste is formed. The polymerisation mixture obtained can thus be subjected directly to the forming operation.

EXAMPLE 1

25 parts by weight of a mixture of N-vinyl pyrrolidone and methyl acrylate in a ratio by weight of 1 : 2, together with 0.7 percent by weight, based on the total monomer, of tert.-butyl hydroperoxide, as an 80 percent solution in tert.-butanol, and 0.4 percent by weight of benzene sulphinic acid, are dissolved in 75 parts by weight of dimethyl formamide containing 0.33 parts by weight of water at room temperature.

An unstirred 10-litre batch is brought to a temperature of 30°C by external heating in a water bath. Some 15 minutes after this temperature has been reached, the internal temperature begins to rise again whilst the external temperature is reduced by the addition of ice to 10°C in stages. After 1.5 hours, the internal temperature has risen to 40°C. After 4 hours, the reaction is substantially complete and the external temperature can be raised to 26° – 28°C again.

A colourless water-clear viscous solution is obtained from which the polymer formed can be readily precipitated with water. The residual methyl acrylate content is found to be 0.7 percent by gas chromatography and the N-vinyl pyrrolidone content is found to be 1.1 percent, based on the total quantity of monomers used. Nitrogen analysis of the precipitated, dried polymer shows that the polymer contains 32.5 percent of incorporated vinyl pyrrolidone, and the K-value of the polymer is 67.4, according to H. Fikentscher, Cellulosechemie 13 (1932) page 58, measured in a 0.5 percent solution in dimethylformamide at 25°C.

EXAMPLE 2

N-vinyl pyrrolidone and methyl acrylate are dissolved in a ratio by weight of 1 : 2 in dimethyl formamide to form an overall 25 percent by weight solution. Yields in excess of 95 percent are obtained after 20 hours polymerisation at a temperature of 40°C, 60°C and 80°C with the quantities of tert.-butyl hydroperoxide, used as an 80 percent solution in tert.-butanol, and benzene sulphinic acid indicated in the table (based on the total quantity of monomers).

| With % by weight | mMol | % tert.-butyl hydroperoxide | at 40° | at 60° | at 80° |
|---|---|---|---|---|---|
| 0.7 | = 7.8 | | | | |
| and 0.53 | = 3.7 | benzene sulphinic acid | colourless | yellows in air | intensively yellow |
| 0.8 | = 5.7 | do. | do. | do. | do. |
| 1.07 | = 7.6 | do. | do. | do. | do. |
| 1.33 | = 9.3 | do. | do. | do. | do. |
| 1.6 | =11.3 | do. | do. | do. | do. |
| 2.13 | =15.0 | do. | do. | colourless | do. |
| With 0.35 | = 3.0 | tert.-butyl hydroperoxide | | | |
| and 0.27 | = 1.9 | benzene sulphinic acid | do. | yellows in air | do. |
| 0.63 | = 3.7 | do. | do. | do. | do. |
| 0.80 | = 5.7 | do. | do. | do. | do. |

The K-values are 60 at 40°C and 50 at 60°C.

EXAMPLE 3

N-vinyl pyrrolidone and methyl acrylate in a ratio by weight of 1 : 2 are dissolved in dimethyl formamide, containing 0.45 percent by weight of water, to form an overall 25 percent by weight solution. The yields quoted in the table are obtained at a polymerisation temperature of 30°C with the indicated quantities of tert.-butyl hydroperoxide, used as an 80 percent solution in tert.-butanol, and benzene sulphinic acid (based on the total quantity of monomers):

| | | | | After 4.4 hours | | After 7.4 hours | |
|---|---|---|---|---|---|---|---|
| | | | | % yield | K-value | % yield | K-value |
| With | 0.7% | by weight | of tert.-butyl hydroperoxide | | | | |
| and | 0.4% | do. | of benzene sulphinic acid | 92 | 68 | 99 | 67.3 |
| do. | 0.2% | do. | do. | 94 | 67.8 | 98 | 70.2 |
| do. | 0.1% | do. | do. | 90 | 72.6 | 98 | 70.6 |
| With | 0.35% | do. | of tert.-butyl hydroperoxide | | | | |
| and | 0.4% | do. | of benzene sulphinic acid | 84 | 72.6 | 100 | 64.8 |
| do. | 0.2% | do. | do. | 88 | 73.7 | 99 | 62.7 |
| do. | 0.1% | do. | do. | 84 | 76.6 | 96 | 61.0 |

EXAMPLE 4

N-vinyl pyrrolidone and methyl acrylate in the ratio by weight indicated in the table are dissolved in dimethyl formamide, containing 0.5 percent by weight of water, to form a 25 percent by weight solution. With 0.7 percent by weight, based on the total quantity of monomers, of tert.-butyl hydroperoxide and 0.4 percent by weight of benzene sulphinic acid, the reaction begins quickly at a temperature of 30°C and leads to a colourless, clear thickly liquid solution over a period of 2 hours. After 20 hours, samples precipitated show the following conversions:

|  |  |  | Conversion | K-value |
|---|---|---|---|---|
| With | 20% | of vinyl pyrrolidone | 100% | 68.2 |
| do. | 25% | do. | 99% | 65.3 |
| do. | 30% | do. | 100% | 69.7 |
| do. | 40% | do. | 92% | 71.3 |
| do. | 50% | do. | 84% | 67.1 |

EXAMPLE 5

25 parts by weight of a mixture of 1 part by weight of N-vinyl pyrrolidone and 2 parts by weight of methyl acrylate are polymerised in 75 parts by weight of dimethyl formamide, containing 0.5 parts by weight of water, for 4.4 hours at 30°C by means of 0.4 percent by weight of benzene sulphinic acid, i.e. 0.0028 mol per cent, based on the total quantity of monomers used, and 0.0078 mol per cent of the organic peroxides quoted in the Table. Clear polymer solutions showing the following conversions are obtained:

|  | % conversion | Viscosity of the solution |
|---|---|---|
| benzoyl peroxide | 61 | low |
| p-chlorobenzoyl peroxide | 75 | do. |
| peracetic acid | 65 | do. |
| tert.-butyl perbenzoate | 93 | high |
| tert.-butyl perpivalate | 85 | do. |
| tert.-butyl peroctoate | 89 | do. |
| tert.-butyl permaleic acid | 88 | viscous |
| cumene hydroperoxide | 95 | high |
| diisopropyl benzene hydroperoxide | 89 | do. |
| menthane hydroperoxide | 93 | do. |
| acetyl cyclohexyl sulphonyl peroxide | 49 | low |
| dicyclohexyl percarbonate | 81 | do. |

EXAMPLE 6

25 parts by weight of each of the monomer mixtures specified in the Table are polymerised for 22 hours at 22°C in 75 parts by weight of dimethyl formamide containing 0.5 parts by weight of water using 0.7 percent by weight, based on the total quantity of monomers used, of tert.-butyl hydroperoxide and 0.4 percent by weight of benzene sulphinic acid. Clear viscous polymer solutions are obtained which show the conversions and K-values indicated.

| N-vinyl pyrrolidine % by weight | Acrylonitrile % by weight | % conversion | K-value |
|---|---|---|---|
| 25 | + 75 | 63 | 78.6 |
| 33.3 | + 66.7 | 75 | 78.1 |
| 50 | + 50 | 84 | 77.6 |

EXAMPLE 7

25 parts by weight of a mixture comprising 33 parts by weight of N-vinyl pyrrolidone, 67 parts by weight of methyl acrylate and 10 or 20 parts by weight of acrylic acid, are dissolved in 75 parts by weight of dimethyl formamide containing 0.5 parts by weight of water. A colourless, clear, highly viscous solution is obtained in a short time at 30°C using 0.7 percent of tert.-butyl hydroperoxide and 0.4 percent by weight of benzene sulphinic acid, based on the total quantity of monomers used. After 20 hours, the conversion is substantially 100 percent. The K-value, as measured in dimethylformamide, is 73.6 where 10 parts by weight of acrylic acid are used and 76.4 where 20 parts by weight are used.

EXAMPLE 8

25 parts by weight of a mixture comprising 30 parts by weight of N-vinyl pyrrolidone, 60 parts by weight of methyl acrylate and 10 parts by weight of methacrylamide; or 26.7 parts by weight of N-vinyl pyrrolidone, 53.3 parts by weight of methyl acrylate and 20 parts by weight of methacrylamide, are dissolved in 75 parts by weight of dimethyl formamide containing 0.5 parts by weight of water. After 20 hours at 30°C, colourless viscous polymer solutions are obtained using 0.35 percent by weight of tert.-butyl hydroperoxide and 0.4 percent by weight of benzene sulphinic acid, based on the total quantity of monomers used. In the first case a conversion of 83 percent and a K-value of 70.2 are found, and in the second case a conversion of 75 percent and a K-value of 69.3 are found.

EXAMPLE 9

25 parts by weight of a mixture comprising 1 part by weight of N-vinyl pyrrolidone and 2 parts by weight of methyl acrylate are dissolved at 30°C in 75 parts by weight of dimethyl formamide containing 0.5 parts by weight of water. Clear viscous solutions are obtained using 0.4 parts by weight of benzene sulphinic acid (= 2.8 millimols) to 100 parts by weight of monomer, together with the peroxides specified in the Table in a quantity of 8 millimols to 100 parts by weight of monomer. The yield of polymer formed reaches the levels indicated after 2 hours:

with 1.4 parts by weight of tert.-butyl perpivalate/100 parts of monomer, 83 percent;

with 1.23 parts by weight of cumene hydroperoxide/100 parts of monomer, 92 percent;

with 0.70 parts by weight of tert.-butyl hydroperoxide/100 parts of monomer, 83 percent;

with 0.28 parts by weight of hydrogen superoxide/100 parts of monomer, 71 percent.

What we claim is:

1. A process for the solution polymerization of a monomer mixture of from 10 to 99 percent by weight of N-vinyl pyrrolidone and from 1 to 90 percent by weight of methylacrylate and/or acrylonitrile which comprises polymerizing solutions containing from 5 to 50 percent by weight of said monomer mixture in a solvent which is a solvent for homopolymers of acrylonitrile or for copolymers of acrylonitrile with vinylidene chloride and/or vinyl chloride, at a temperature below 80°C. in the presence of a catalyst system comprising from 0.1 to 3 percent by weight, based on the quantity of monomers to be polymerized, of an organic peroxide selected from the group consisting of benzoyl peroxide, p-chloro benzoyl peroxide, peracetic acid, tert.-butyl hydroperoxide, cumene hydroperoxide, tert.-butyl perbenzoate, -peroctoate, -perpivalate, diisopropyl benzene hydroperoxide, menthene hydroperoxide, permaleic acid, acetyl cyclo hexyl sulfonyl peroxide and dicyclo hexyl percarbonate, and also from 0.1 to 3 mols, based on the peroxide, of an aromatic sulphinic acid selected from the group consisting of benzene and p-toluene sulphinic acid and the homologues and substitution products of benzene sulphinic acid.

2. A process as claimed in claim 1 in which the solvent additionally contains from 0.2 to 2 percent of water or an aliphatic alcohol with from 1 to 4 carbon atoms.

3. A process as claimed in claim 1, in which the solvent for polyacrylonitrile is dimethyl formamide, dimethyl acetamide, ethylene carbonate, γ-butyrolactone, dimethyl sulphoxide or an aqueous zinc chloride or sodium thiocyanate solution.

4. A process as claimed in claim 1, in which the solvent for a copolymer of acrylonitrile with vinylidene chloride and/or vinyl chloride is acetone, cyclohexane or tetrahydrofuran.

5. A process as claimed in claim 1, in which the polymerisation is carried out at a temperature of from +10° to +40°C.

6. A process as claimed in claim 1, in which the polymerisation is carried out in the presence of from 0.5 to 1.5 percent by weight, based on the quantity of monomer to be polymerised, of the organic peroxide or of the hydrogen peroxide and in the presence of from 0.2 to 0.5 mols, based on the peroxide, of the aromatic sulphinic acid.

7. A process as claimed in claim 1, in which the organic hydroperoxide is tert.-butyl hydroperoxide.

8. A process as claimed in claim 1, in which the aromatic sulphinic acid is benzene sulphinic acid or toluene sulphinic acid.

9. A process as claimed in claim 1, in which the catalyst system comprises from 0.1 to 3 percent by weight, based on the monomers used, of tert.-butyl hydroperoxide together with 0.1 to 3 percent by weight of benzene or p-toluene sulphinic acid.

* * * * *